United States Patent [19]

Schroeder

[11] 4,394,061
[45] Jul. 19, 1983

[54] APPARATUS FOR ALIGNING AN OPTICAL FIBER IN AN LED PACKAGE

[75] Inventor: Scott L. Schroeder, Belmont, Calif.

[73] Assignee: GTE Automatic Electric Incorporated, Northlake, Ill.

[21] Appl. No.: 341,722

[22] Filed: Jan. 22, 1982

[51] Int. Cl.³ .............................................. G02B 7/26
[52] U.S. Cl. .................... 350/96.20; 250/227; 29/464; 156/296; 156/64; 269/41
[58] Field of Search ................ 350/96.20; 269/41, 43; 29/407, 464, 468, 569 L; 156/64, 180, 296; 250/227; 357/17, 19, 74; 24/129 A, 129 C

[56] References Cited

U.S. PATENT DOCUMENTS

| | | | |
|---|---|---|---|
| 2,105,954 | 1/1938 | Rippe | 269/43 |
| 3,938,895 | 2/1976 | Bridger et al. | 350/96.20 |
| 3,999,841 | 12/1976 | Dakss et al. | 350/96.20 |
| 4,101,197 | 7/1978 | Kent et al. | 250/227 |
| 4,107,242 | 8/1978 | Runge | 350/96.20 |
| 4,113,346 | 9/1978 | Jackson et al. | 350/96.20 |
| 4,118,100 | 10/1978 | Goell et al. | 350/96.20 |
| 4,225,213 | 9/1980 | McBride, Jr. et al. | 350/96.20 |
| 4,302,267 | 11/1981 | Palmer et al. | 269/43 |
| 4,357,072 | 11/1982 | Goodfellow et al. | 350/96.20 |

*Primary Examiner*—Gene Mancene
*Assistant Examiner*—Paul S. Polakowski
*Attorney, Agent, or Firm*—Russell A. Cannon

[57] ABSTRACT

Method and apparatus for aligning one end of an optical fiber in the emitting well of an LED employs an elongated rod having a flat milled halfway through the mid-section thereof for forming a recess and first and second channels extending between the recess and an associated end of the rod to the depth of the recess. The two channels are located in front of the bottom of the recess and are oriented at 90° with respect to each other in an end view. The channels also overlap along the center line of the rod and are dimensioned for loosely-releasably receiving and supporting a length of fiber in a straight line while the one end thereof is aligned with the emitting surface of the LED.

18 Claims, 6 Drawing Figures

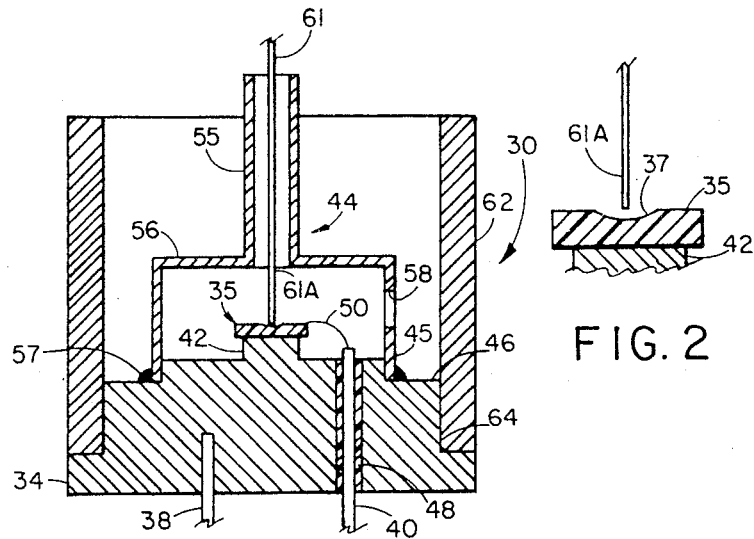
FIG. 1
FIG. 2
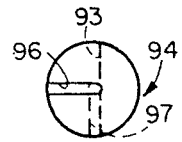
FIG. 5
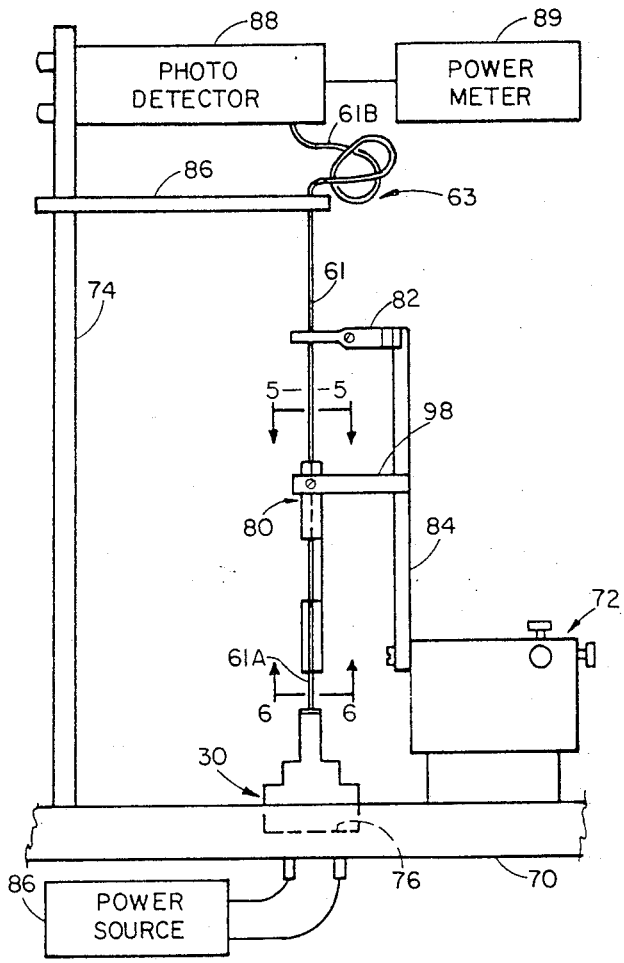
FIG. 3
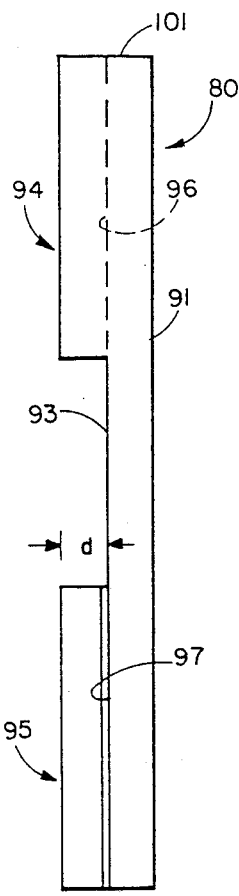
FIG. 4
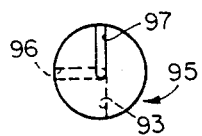
FIG. 6

APPARATUS FOR ALIGNING AN OPTICAL FIBER IN AN LED PACKAGE

BACKGROUND OF THE INVENTION

This invention relates to fabricating pigtailed LED assemblies and more particularly to method and apparatus for aligning the end of an optical fiber in the concave emitting well in an LED.

A light emitting diode (LED) is commonly employed as the source of light in the transmitter of a fiber optic communication system. In order to maximize the amount of light available for transmission in the fiber transmission lines of the system, an assembly is fabricated with a fiber pigtail precisely aligned in the emitting well of the LED. The practice is to secure the fiber to the side of a micro-manipulator with two tweezers that are vertically spaced approximately three inches apart. Each of the tweezers lightly clamps the fiber at what approximates a point contact, with the lower-one end of the fiber being adjacent the emitter surface of the LED. After the micro-manipulator is operated to obtain the maximum transmission of light in the fiber, an epoxy resin is poured into the chimney of a support member associated with the LED for fixing the orientation of it and the fiber. It has been found that there is normally a bow in the unsupported length of fiber between and below the two tweezers which makes it difficult to precisely align the one end of the fiber in the emitting well of the LED so as to obtain maximum transmission of light in the fiber. An object of this invention is the provision of improved method and apparatus for fabricating pigtailed LED assemblies.

SUMMARY OF THE INVENTION

In accordance with this invention, a ferrule for loosely-releaseably supporting a filament over at least the major portion of a limited length thereof and holding the limited length of filament in a straight line so as to reduce bowing of the filament adjacent one end of the ferrule that is proximate the emitting surface of a light emitting element comprises: an elongated member having a length between opposite ends thereof that extends in a prescribed direction along a given straight line and which corresponds to the limited length; the member having a recess cut into the exterior surface thereof over its breadth for defining first and second sections on opposite sides of the recess and at opposite ends of the member, the recess extending over a prescribed length which is much less than the limited length and having a depth that is at least equal to the distance between the given line and the circumference of the member; the first and second sections having associated first and second channels therein extending over the lengths thereof along the given line and being in front of the bottom of the recess so as to open into the recess, the channels being dimensioned for receiving the largest filament that is to be supported and extending into the member to the given line; the two channels overlapping along the given line sufficiently for receiving a filament therein and being oriented in an end view of the member looking along the given line for forming an acute angle therebetween in the area of the recess that is sufficient for receiving and holding a filament, laid in the channels and extending across the recess, in a straight line over the length of the member. In a preferred embodiment, the recess is formed by a flat in a plane that includes the given line for causing the filament to contact and be supported by surfaces of the channels and the flat over the length of the member.

DESCRIPTION OF DRAWING

This invention will be more fully understood from the following detailed descriptions of preferred embodiments thereof, together with the drawing in which the figures are not drawn to scale and in which:

FIG. 1 is a greatly enlarged section view of an LED package 30 with an optical fiber 61 in the chimney 55 of the support member 44 thereof;

FIG. 2 is a greatly enlarged section view of the LED Chip 35 in FIG. 1 with the end 61A of the fiber in the emitting well 37 thereof;

FIG. 3 is a front elevation view of apparatus utilized in faricating pigtailed LED assemblies;

FIG. 4 is a greatly enlarged front elevation view of the ferrule 80 in FIG. 3;

FIG. 5 is a top view of the ferrule taken along line 5—5 in FIG. 3; and

FIG. 6 is a bottom view of the ferrule taken along line 6—6 in FIG. 3.

DESCRIPTION OF PREFERRED EMBODIMENTS

Referring now to FIGS. 1 and 2, the LED package 30 comprises an electrically conductive header 34 having a pair of electrodes 38 and 40 therein and a pedestal 42 thereon supporting a light emitting semiconductor chip 35, and a support member 44 that is adapted for holding an optical fiber 61 therein. The electrode 38 is electrically connected to the header 34, which may be made of copper. The electrode 40 extends through the header, however, and is dielectrically supported in it by a non-conductive epoxy cement 48 such as EPO-TEK H72 manufactured by EPO-TEK, Inc. A gold wire 50 is bonded to the LED chip 35 and to the end of electrode 40 for completing an electrical circuit therebetween. This makes it possible for the LED to pass electrical current and emit light from the well 37 therein (see FIG. 2) when the electrodes 38 and 40 are connected to a power supply. The support member 44 comprises a chimney 55 that is coaxial with a much larger cylindrical sleeve section 56 thereof. The ID of the open end of the sleeve 56 is sized to slide smoothly over a circular projection 45 on the header until it rests on the shoulder 46. This centers the opening in the chimney over the emitting well in the LED. The sleeve 56 is bonded to the header with epoxy cement 57 for keeping the chimney centered over the LED. The sleeve 56 has openings 58 therein which let an operator see how close the end of fiber 61 is to the LED's emitting surface.

A pigtailed LED assembly is fabricated by energizing the LED for causing it to emit light; passing the end 61A of an optical fiber 61 through the central opening through the chimney 55; precisely locating the end 61A of the fiber in the emitting well 37 and positioning it approximately 0.001 inch from the emitting surface of the LED chip 35; locating epoxy cement in the opening in the chimney 55; and curing the epoxy cement while maintaining the fiber end 61A positioned in the emitting well for providing maximum transmission of light in the fiber. A shrink-fit tubing (not shown) is then placed over the fiber and chimney 55 for protecting the fiber. A cylindrical heat sink 62 is then placed over the circular flange 64 on the header and bonded to the latter, e.g. with an epoxy cement, prior to filling the cavity between the heat sink 62 and support member 44 with a thermally conductive epoxy such as EPO-TEK 930.

Apparatus for fabricating a pigtailed LED assembly is illustrated in FIG. 3 and comprises a table 70 supporting a micro-manipulator 72 and post 74 adjacent an opening 76 in the table which receives an LED package 30; a vertically spaced apart ferrule 80 and tweezers 82 that are attached to a post 84 in the side of the micro-manipulator for supporting the fiber; and a tweezers 86 that is attached to the post 74 for supporting a loop 63 of excess fiber above the LED package 30. In accordance with this invention, the tweezers 82 fix the relative position of the fiber end 61A with respect to the top of the micro-manipulator and the ferrule 80 holds the length of fiber adjacent the end 61A in a straight line. The electrodes 38 and 40 of an LED package 30 in the table opening 76 are connected to the power supply 86 for energizing the LED and causing it to emit light into the one end 61A of the fiber. A photodetector 88 and power meter 89 are connected to the other end 61B of the fiber for indicating the intensity of light transmitted through the fiber.

Referring now to FIGS. 4–6 the ferrule 80 is essentially a brass rod 91 having a flat 93 milled to a prescribed depth d in the central section thereof and a pair of longitudinal channels 96 and 97 milled to the same depth d in the upper and lower sections 94 and 95 thereof. The channels are located in front of the plane including the flat bottom 93 of the recess and have a width that is much greater than the diameter of an optical fiber 61. The channels are also orthogonal to each other in an end view of the ferrule (see FIGS. 5 and 6) and are oriented so that they overlap in front of the flat 93 by an amount that is much larger than the cross-sectional area of the fiber 61. Thus, there is a straight line such as the center line of the rod 91 that extends in front of the flat 93 and through the overlapping portions of the channels 96 and 97. The length of the flat 93 is much greater than the bending radius of an optical fiber 61. The ferrule 80 is vertically mounted in the apparatus of FIG. 3 with a clamp 98 on the post 84 that firmly grips only the sides of the ferrule. This leaves the channel 96 exposed over its length (along the left side of the upper section 94 in FIGS. 3 and 4).

In accordance with this invention, the fiber 61 in FIG. 3 is mounted in an LED package 30 in the table opening 76 (see FIG. 3) by pressing a length of the fiber 61 into the upper channel 96 of the ferrule 80, bending the fiber across the flat 93, and inserting the adjacent length of the fiber 61 into the lower channel 97. Since the channels intersect in a right angle and the excess fiber at 63 is directly above the center line of the ferrule, the channels loosely-releaseably support the length of fiber 61 that is in the ferrule in a straight line. After the end 61A of the fiber is inserted into the chimney 55 of the LED package, the tweezers 82 are made to lightly clamp the fiber and fix the relative position of the fiber end 61A in the micro-manipulator. The micro-manipulator is then operated to center the fiber end 61A over, and locate it approximate 0.001 inch above, the LED's emitting surface 37, i.e., to position the fiber end 61A for obtaining maximum transmission of light on the fiber. When a reading on meter 89 indicates optimum positioning of the fiber end 61A, epoxy cement is injected into the top of the chimney 55 until it forms a small meniscus at the bottom of the chimney that is inside the sleeve 56. If the intensity of the transmitted light decreases during curing of the epoxy cement, the position of the fiber end 61A may be moved to compensate for it. The LED package and connected fiber 61 are removed from the apparatus in FIG. 3 by releasing the clamps 82 and 86 and removing the fiber from the channels in the ferrule prior to threading a heat shrinkable protective tubing (not shown) over the fiber and chimney 55 of the support member 44, attaching the heat sink 62 to the pigtailed package 30, and filling the cavity formed between the heat sink and support member with a thermally conductive epoxy.

In apparatus for practicing this fabrication method that was built and satisfactorily operated for manufacturing pigtailed LED assemblies with a 1 meter length of 0.002 inch diameter optical fiber, the ferrule was fabricated from a 2.75 inch length of a 0.250 inch diameter half-hard brass rod. The flat 93 was 0.75 inch long, $d = 0.130$ inch, and the channels were 0.014 inch wide and one inch long. The tweezers 82 was located 1.5 inches above the end 101 of the ferrule and was caused to clamp the fiber when it was located in the channels and the chimney 55 and approximately 0.125 inch above the LED. The chimney had a 0.028 inch ID, a length of 0.120 inch, and was spaced 0.60 inch above the semiconductor chip 35. The intensity of light transmitted through the fiber in the apparatus in FIG. 3 was found to change very little during curing of epoxy filler that was placed in the fiber support chimney.

Although this invention is described in relation to preferred embodiments thereof, variations and modifications will occur to those skilled in the art. By way of example, the ferrule 80 may have a circumference that is irregularly shaped or that is a regular shape other than a circle, e.g., it may be a rectangular bar or an elliptically shaped rod. Also, the recess may be formed by other than milling and the bottom thereof may be other than flat. Additionally, the depth of the recess may be greater than that of the channel 96. Further, the flat 93 and channels do not have to be centered in the rod 91. Also, the channels may intersect at angles of other than 90°, although the angle of intersection must be sufficient to hold the fiber 61 in a straight line in the ferrule and preferrably be less than 180°. The scope of this invention is therefore defined by the appended claims, rather than the preceeding detailed descriptions.

What is claimed is:

1. A ferrule for loosely-releasably supporting a filament over at least the major portion of a limited length thereof and holding the limited length of filament in a straight line so as to reduce bowing of the filament adjacent one end of the ferrule that is proximate the emitting surface of a light emitting element, said ferrule comprising:

an elongated member having a length between opposite ends thereof that extends in a prescribed direction along a given straight line and which corresponds to the limited length;

said member having a recess cut into the exterior surface thereof over the breadth thereof for defining first and second sections on opposite sides of the recess and at opposite ends of said member, the recess extending over a prescribed length which is much less than the limited length and having a depth that is at least equal to the distance between the given line and the perimeter of said member;

said first section having a first channel therein extending over the length thereof along the given line and being in front of the bottom of the recess so as to open into the recess, the first channel being dimensioned for receiving the largest filament to be supported and extending into said member to the given line; and said second section having a second channel therein extending over the length thereof along the given line and being in front of the bottom of the recess so as to open into the recess, the second channel also being dimensioned for receiving the largest filament to be supported and extending into said member to the given line;

the first and second channels overlapping along the given line sufficiently for receiving a filament therein, and being oriented in an end view of said member looking along the given line for forming an angle therebetween that is sufficient for receiving and holding a filament therein.

2. The ferrule according to claim 1 wherein said angle between said first and second channels is sufficient for causing said first and second sections of said member to hold a filament laid in said channels and extending across said recess and to maintain the filament straight over the length of said member.

3. The ferrule according to claim 2 wherein the depth of the recess is greater than the distance between the given line and the circumference of said member.

4. The ferrule according to claim 2 wherein the bottom of said recess is a flat surface of said member in a plane that includes the given line for causing the filament to contact and be supported by surfaces of said channels and said flat bottom over the length of said member.

5. The ferrule according to claim 3 wherein said angle is approximately 90°.

6. The ferrule according to claim 2 wherein the length of the recess is sufficient for enabling a filament to be inserted into one of said channels over the length thereof, to be bent across the recess, and to be inserted into the other one of said channels.

7. The ferrule according to claim 6 wherein said first and second channels are in associated planes that intersect along said given line at said angle, said channels overlapping along said given line an amount that is somewhat greater than that required for receiving the largest filament that is to be supported for enabling a loose sliding fit of a filament in a channel.

8. The ferrule according to claim 6 wherein the filament is an optical fiber.

9. In a method of aligning one end of an optical fiber with the emitting surface of a light emitting element comprising the steps of clamping spaced apart points of the fiber to a micro-manipulator, with the one end of the fiber being adjacent to one clamp point and the emitting surface, and operating the micro-manipulator for precisely aligning the one end of the fiber with respect to the emitting surface, the improvement comprising: replacing the clamping steps with the step of loosely-releasably supporting a length of the fiber in a straight line in a prescribed direction on the side of the micro-manipulator over a first limited length thereof that is much greater than that for point contact type clamping for reducing bowing in the fiber near the one end thereof.

10. The method according to claim 9 including the additional step of fixing the relative position of the fiber in the prescribed direction with respect to a point on the micro-manipulator by clamping a point on the fiber adjacent an end of the first limited length thereof.

11. The method according to claim 10 further comprising the step of loosely-releasably supporting the fiber in a straight line on the side of the micro-manipulator over a second limited length of fiber that is closely spaced to the first length of fiber for maintaining the first and second limited lengths of fiber and the short length of fiber therebetween substantially straight and aligned in the prescribed direction.

12. The method according to claim 11 wherein each of the first and second limited lengths of fiber is supported for restricting movement of the fiber in a direction, other than the prescribed direction, that the other one of the first and second limited lengths of fiber is relatively free to move in.

13. The method according to claim 12 wherein said step of fixing the relative position of the fiber comprises clamping a point on the fiber that is adjacent the one of the ends of the first and second limited lengths thereof that is spaced farthest away from the one end of the fiber.

14. The method according to claim 13 wherein said steps of supporting the first and second lengths of fiber comprise: attaching an elongated ferrule in a generally vertical direction on the side of the micro-manipulator, the ferrule having a recess cut in the exterior surface of the central portion thereof which defines first and second sections at opposite ends thereof, each ferrule section having an elongated channel therein extending from the associated end thereof into the recess, the channels being radially offset from each other in an end view for forming an angle therebetween in the area of the recess and being overlapping at the bottoms thereof along a line extending through the recess; inserting a limited length of fiber into one of said channels along the length thereof; bending the fiber across the recess; and inserting another limited length of fiber into the other one of the channels along the length of the latter.

15. The method according to claim 14 wherein said step of fixing the relative position of the fiber comprises clamping a point on the fiber adjacent the end of the ferrule spaced away from the emitting surface.

16. The method according to claim 15 wherein the angle between the first and second channels is sufficient for causing the associated end sections of the ferrule to hold the fiber in the channels and maintain the fiber straight over the length of the ferrule.

17. The method according. to claim 16 wherein the angle between the first and second channels is approximately 90°.

18. The method according to claim 17 including the additional steps of securely attaching the one end of the fiber in a light emitting diode package, unclamping the fiber for unfixing the relative position thereof, removing the length of fiber from one of the channels, bending the fiber away from the recess, and removing the length of fiber from the other one of the channels.

* * * * *